(12) United States Patent
Guo et al.

(10) Patent No.: US 8,594,658 B2
(45) Date of Patent: Nov. 26, 2013

(54) METHOD AND APPARATUS FOR DIAGNOSING FEEDER MISCONNECTION

(71) Applicant: Huawei Technologies Co., Ltd., Guangdong (CN)

(72) Inventors: Kuanxin Guo, Shenzhen (CN); Ruina Chang, Xi'an (CN); Sumin Qian, Xi'an (CN); Xufeng Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/732,255

(22) Filed: Dec. 31, 2012

(65) Prior Publication Data
US 2013/0115939 A1    May 9, 2013

Related U.S. Application Data

(63) Continuation of application No. PCT/CN2012/078856, filed on Jul. 19, 2012.

(30) Foreign Application Priority Data

Nov. 4, 2011  (CN) .......................... 2011 1 0363870

(51) Int. Cl.
*H04W 24/00*    (2009.01)
(52) U.S. Cl.
USPC ............ 455/423; 455/424; 455/453; 455/101
(58) Field of Classification Search
USPC .................................. 455/423, 424, 453, 101
See application file for complete search history.

(56) References Cited

U.S. PATENT DOCUMENTS 5,216,434 A * 6/1993 Fukumura ...................... 343/876
8,060,077 B2 * 11/2011 De Pomian .................... 455/423

(Continued)

FOREIGN PATENT DOCUMENTS

| CN | 101257695 A | 9/2008 |
| CN | 101516101 A | 8/2009 |
| CN | 101964988 A | 2/2011 |
| CN | 102026236 A | 4/2011 |

OTHER PUBLICATIONS

Foreign Communication From a Counterpart Application, Partial Translation of Chinese Publication CN101516101A, 7 pages, Aug. 26, 2009.

(Continued)

*Primary Examiner* — Temica M Beamer
(74) *Attorney, Agent, or Firm* — Conley Rose, P.C.; Grant Rodolph; Nicholas K. Beaulieu

(57) ABSTRACT

The present invention relates to a method and an apparatus for diagnosing a feeder misconnection. The method includes: for each planned non-co-site strong neighboring cell of a sector to be analyzed, by using each sector of a base station where the sector to be analyzed is located as an interference source, determining a sector having the greatest interference with the non-co-site strong neighboring cell; and when in the planned non-co-site strong neighboring cells of the sector to be analyzed, the sector having the greatest interference with the non-co-site strong neighboring cell is in another sector except the sector to be analyzed, and a ratio of the number of non-co-site strong neighboring cells of the another sector to the total number of the non-co-site strong neighboring cells reaches a preset first threshold, determining that a feeder of the sector to be analyzed is misconnected.

2 Claims, 12 Drawing Sheets

(56) References Cited

U.S. PATENT DOCUMENTS

2002/0119772 A1* 8/2002 Yoshida .................... 455/423
2008/0261587 A1* 10/2008 Lennartson et al. ......... 455/424
2013/0084851 A1* 4/2013 Li .............................. 455/424

OTHER PUBLICATIONS

Foreign Communication From a Counterpart Application, Partial Translation of Chinese Publication CN101964988A, 9 pages, Feb. 2, 2011.

Foreign communication from a counterpart application, PCT application PCT/CN2012/078856, International Search Report dated Oct. 18, 2012, 6 pages.

Foreign communication from a counterpart application, PCT application PCT/CN2012/078856, English Translation International Search Report dated Oct. 18, 2012, 8 pages.

Foreign communication from a counterpart application, PCT application PCT/CN2012/078856, Written Opinion dated Oct. 18, 2012, 8 pages.

Foreign communication from a counterpart application, PCT application PCT/CN2012/078856, English Translation Written Opinion dated Oct. 18, 2012, 11 pages.

* cited by examiner

US 8,594,658 B2

METHOD AND APPARATUS FOR DIAGNOSING FEEDER MISCONNECTION

CROSS-REFERENCE TO RELATED APPLICATIONS

This application is a continuation of International Application No. PCT/CN2012/078856, filed on Jul. 19, 2012, which claims priority to Chinese Patent Application No. 201110363870.1, filed on Nov. 4, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications technologies, and in particular, to a method and an apparatus for diagnosing a feeder misconnection in a mobile communication system.

BACKGROUND

In a mobile communication system, a conductor or a conductor group for transmitting a signal between a base station transceiver equipment and an antenna is called a feeder. In a general case, a cell has three sectors, and each sector has two antennas. However, a cross polarized antenna is generally adopted at present, that is, one antenna seen from physical packaging. The cross polarized antenna includes two ports, one port is Tx/Rx, which is used for reception and transmission and is a main; and the other port is Rx, which is used for reception and is a diversity. Generally, a true north direction is usually defined as a 0° direction during planning a wireless network, and three foregoing cross polarized antennas are placed on three directions of 0°, 120°, and 240° clockwise. A coverage area of each of the three antennas is a sector corresponding to the antenna.

When feeders are actually installed between a base station and the antenna, it is possible to misconnect a part of the feeders, for example, feeders of a sector A are connected to an antenna of a sector B, where A and B are just general terms adopted for the convenience of description. Therefore, an actual coverage area of the cell is different from a planned and designed one, and parameters, such as a neighboring cell/a frequency/a radio frequency (RF), configured during the planning become unreasonable, which causes problems such as switchover/call drop/access occurring in actual network running of the cells. However, feeder misconnection is not the unique reason causing these problems; meanwhile, since specific conditions of the cells with different problems are not the same, it is resulted that much difficulty is brought to judge a specific feeder misconnection type.

SUMMARY

Considering the foregoing problems in the prior art, embodiments of the present invention provide a method and an apparatus for diagnosing a feeder misconnection, so as to diagnose whether a sector-level feeder misconnection exists in a running wireless network.

An embodiment of the present invention provides a method for diagnosing a feeder misconnection, including: for each of planned non-co-site strong neighboring cells of a sector to be analyzed, determining a sector having the greatest interference with the non-co-site strong neighboring cell by using each sector of a base station where the sector to be analyzed is located as an interference source; and the sector having the greatest interference with the non-co-site strong neighboring cell is another sector except the sector to be analyzed, and in the planned non-co-site strong neighboring cells of the sector to be analyzed, when a ratio of the number of non-co-site strong neighboring cells of the another sector to the total number of the non-co-site strong neighboring cells of the sector to be analyzed reaches a preset first threshold, determining that a feeder of the sector to be analyzed is misconnected.

An embodiment of the present invention further provides a method for diagnosing a feeder misconnection, including: for each of planned non-co-site strong neighboring cells of a sector to be analyzed, determining a sector where a terminal using the non-co-site strong neighboring cell as a serving cell is switched, for the maximum number of switch times among the number of switch times within a predetermined time length, from the non-co-site strong neighboring cell to each sector of a base station where the sector to be analyzed is located; and the sector where the terminal using each non-co-site strong neighboring cell as the serving cell is switched, for the maximum number of switch times among the number of switch times, from its serving cell to each sector of the base station where the sector to be analyzed is located is another sector except the sector to be analyzed, and in all of the planned non-co-site strong neighboring cells of the sector to be analyzed, when a ratio of the number of non-co-site strong neighboring cells of the another sector to the total number of the non-co-site strong neighboring of the sector to be analyzed cells reaches a preset second threshold, determining that a feeder of the sector to be analyzed is misconnected.

An embodiment of the present invention further provides an apparatus for diagnosing a feeder misconnection, including: a first processor configured to, for each of planned non-co-site strong neighboring cells of a sector to be analyzed, determine a sector having the greatest interference with the non-co-site strong neighboring cell by using each sector of a base station where the sector to be analyzed is located as an interference source; and a second processor configured to, the sector having the greatest interference with the non-co-site strong neighboring cell is another sector except the sector to be analyzed, and in the planned non-co-site strong neighboring cells of the sector to be analyzed, when a ratio of the number of non-co-site strong neighboring cells of the another sector to the total number of the non-co-site strong neighboring cells reaches a preset first threshold, determine that a feeder of the sector to be analyzed is misconnected.

An embodiment of the present invention further provides an apparatus for diagnosing a feeder misconnection, including: a first processor configured to, for each of planned non-co-site strong neighboring cells of a sector to be analyzed, determine a sector where a terminal using the non-co-site strong neighboring cell as a serving cell is switched, for the maximum number of switch times among the number of switch times within a predetermined time length, from the non-co-site strong neighboring cell to each sector of a base station where the sector to be analyzed is located; and a second processor configured to, for the sector where the terminal using each non-co-site strong neighboring cell as the serving cell is switched, for the maximum number of switch times among the number of switch times, from its serving cell to each sector of the base station where the sector to be analyzed is located is another sector except the sector to be analyzed, and in all of the planned non-co-site strong neighboring cells of the sector to be analyzed, when a ratio of the number of non-co-site strong neighboring cells of the another sector to the total number of the non-co-site strong neighboring cells reaches a preset second threshold, determine that a feeder of the sector to be analyzed is misconnected.

Embodiments of the present invention further provide a method and an apparatus for diagnosing a feeder misconnection, so as to diagnose whether a main of a sector in a running wireless network is misconnected.

An embodiment of the present invention further provides a method for diagnosing a feeder misconnection, including: determining, within different predetermined angle ranges, the number of terminals using a sector to be analyzed as a serving cell; determining a direction of a sector with the maximum number of terminals using the sector to be analyzed as a serving cell, as an actual distribution direction of users of the sector to be analyzed; and according to whether the actual distribution direction of users of the sector to be analyzed is consistent with a planned direction of users of the sector to be analyzed, determining whether a feeder of the sector to be analyzed is misconnected.

An embodiment of the present invention further provides an apparatus for diagnosing a feeder misconnection, including: a first processor configured to determine, within different predetermined angle ranges, the number of terminals using a sector to be analyzed as a serving cell; a second processor configured to determine a direction of a sector with the maximum number of terminals using the sector to be analyzed as a serving cell, as an actual distribution direction of users of the sector to be analyzed; and a third processor configured to: according to whether the actual distribution direction of users of the sector to be analyzed is consistent with a planned direction of users of the sector to be analyzed, determine whether a feeder of the sector to be analyzed is misconnected.

By using the method and the apparatus in the embodiments of the present invention, it can be diagnosed, in an active prevention manner, whether a feeder misconnection problem of a specific type exists in a mobile communication system, which has relatively high accuracy, and can find a problem and solve the problem in time, thereby improving network performance and user experience.

BRIEF DESCRIPTION OF THE DRAWINGS

The objectives, features, characteristics, and advantages of the present invention are made explicit through the following detailed description with reference to the accompanying drawings.

DETAILED DESCRIPTION

Embodiments of the present invention provide a solution for diagnosing a feeder misconnection. According to the technical solution, it is determined, by using measurement data actually reported by a terminal, whether a feeder of a sector to be analyzed is misconnected.

Embodiments of the present invention are described in detail in the following with reference to the accompanying drawings.

Figure 1:
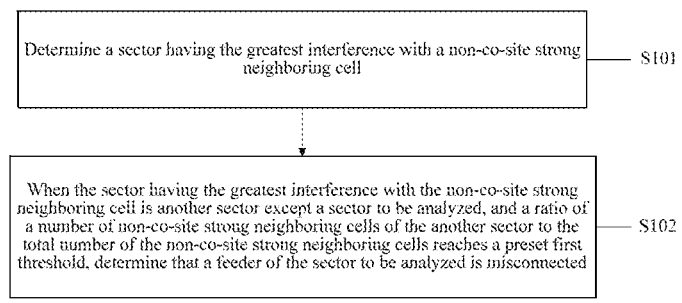
FIG. 1 is a flow chart of a method for diagnosing a feeder misconnection according to an embodiment of the present invention.

FIG. 1 is a flow chart of a method for diagnosing a feeder misconnection according to a first embodiment of the present invention. As shown in FIG. 1, the method includes:

Step S101: for each of planned non-co-site strong neighboring cells of a sector to be analyzed, by using each sector of a base station where the sector to be analyzed is located as an interference source, determine a sector having the greatest interference with the non-co-site strong neighboring cell, where the non-co-site strong neighboring cell refers to a strong neighboring cell that does not belong to the same base station as the sector to be analyzed, that is, not in the same site.

Step S102: When in the planned non-co-site strong neighboring cells of the sector to be analyzed, the sector having the greatest interference with the non-co-site strong neighboring cell is another sector except the sector to be analyzed, and a ratio of the number of non-co-site strong neighboring cells of the another sector to the total number of the non-co-site strong neighboring cells reaches a preset threshold (a first threshold), determine that a feeder of the sector to be analyzed is misconnected. In this case, the feeder misconnection refers to the feeder of the sector to be analyzed being connected to an antenna of another sector which is co-site with the sector to be analyzed.

A basic principle of this embodiment is that, sectors of the base station where the sector to be analyzed is located are seen as different interference sources, and interference that each non-co-site strong neighboring cell of the sector to be analyzed receives is analyzed, respectively, according to an actual measurement report (MR) reported by a terminal. If no misconnection occurs in the sector to be analyzed, the interference that the sector to be analyzed brings to the planned non-co-site strong neighboring cell is the greatest; and if a misconnection occurs in the sector to be analyzed, interference that another sector which is co-site with the sector to be analyzed brings to its non-co-site strong neighboring cell is greater than the interference that the sector to be analyzed brings to the non-co-site strong neighboring cell. Exemplarily, determine by comparing received signal strength of the terminal in the non-co-site strong neighboring cell serving as a serving cell with a received signal strength of the terminal in the sector serving as an interference cell. Diagnosis is performed by using received signal strength actually reported by the terminal during network operation, which has relatively high accuracy.

Specifically, MR data reported by the terminal using each strong neighboring cell as a serving cell is screened; by using a sector 1, a sector 2, and a sector 3 as interference sources, measured level strength of the terminal in its serving cell, that is, a current strong neighboring cell to be analyzed, and measured level strength of the terminal in each one of the sectors serving as the interference sources, that is, the sector 1, the sector 2, and the sector 3 may be obtained from the MR data. Through statistical analysis performed on a difference between the measured level strength of the terminal in the strong neighboring cell to be analyzed and the measured level strength of the terminal in each sector serving as the interference source, values of interference which are of the sector 1, the sector 2, and the sector 3 and are received by each strong neighboring cell Nn of the sector to be analyzed can be obtained. Then, a sector having the greatest interference with each strong neighboring cell can be determined.

The first threshold may be a percentage set according to demands, preferentially, a percentage greater than or equal to 70%. Definitely, the first threshold may also be other percentages, such as 50% or 60%.

The method for diagnosing a feeder misconnection in this embodiment is a method for judging a sector-level feeder misconnection, that is, a feeder that should be connected to a main of a sector and a feeder that should be connected to a diversity of the sector are misconnected to a main and a diversity of another sector, respectively, while the misconnection does not occurs between the main and the diversity. Therefore, from FIG. 2 to FIG. 7, the feeder of each sector is exemplarily shown by one feeder for connection, which is only exemplary and does not indicate that each sector only has one feeder. Besides, the sector-level feeder misconnection of a sector generally refers to a main and a diversity (that is, interfaces corresponding to the main and the diversity of the sector at the base station) of the sector are not connected to a main and a diversity of an antenna of the sector, but are connected to a main and a diversity of an antenna of another sector, respectively.

Figure 2:
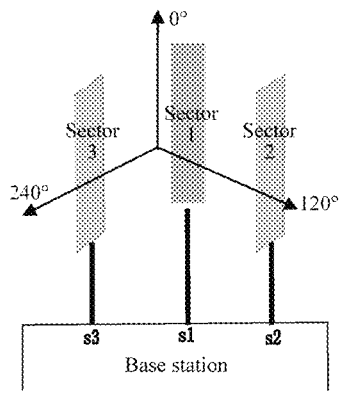
FIG. 2 and FIG. 3 are schematic diagrams of a normal feeder connection of three cells of a base station and of a normal coverage condition of the cells, respectively.
Figure 3:
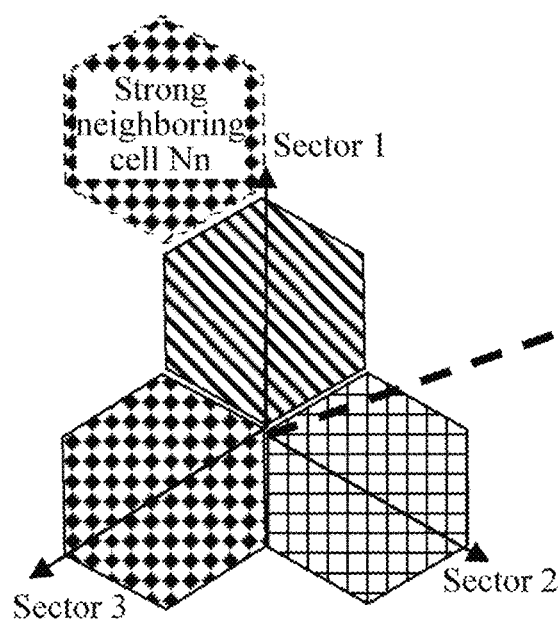
Figure 4:
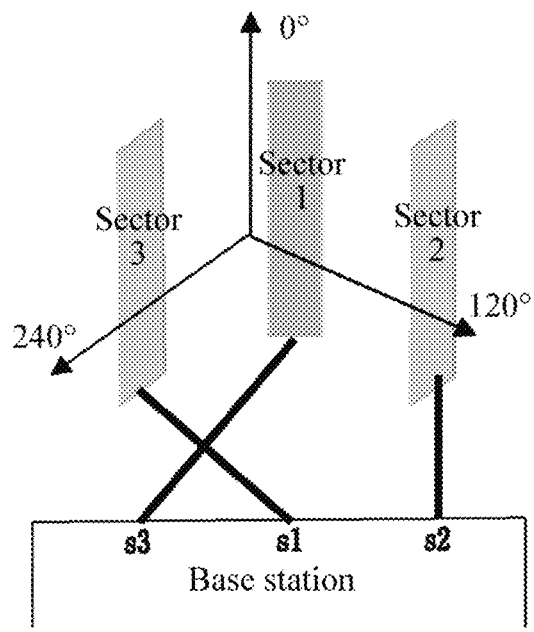
FIG. 4 and FIG. 5 are schematic diagrams of a feeder inverse connection of two co-site sectors and of a corresponding sector coverage condition, respectively.
Figure 5:
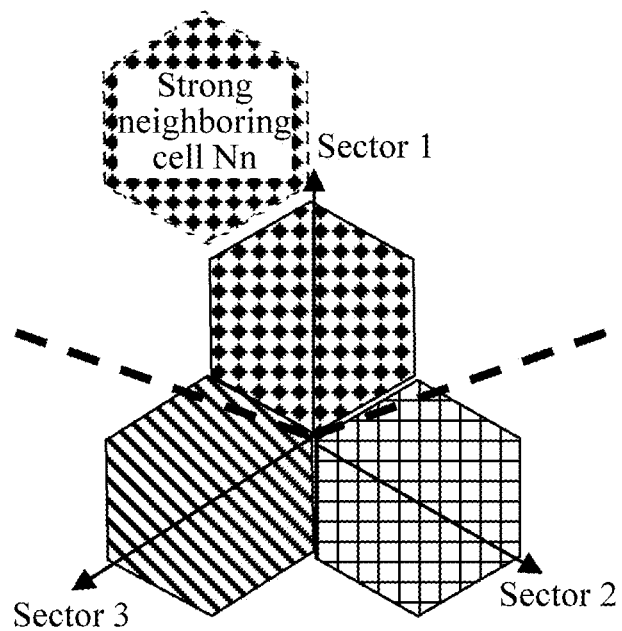
Figure 6:
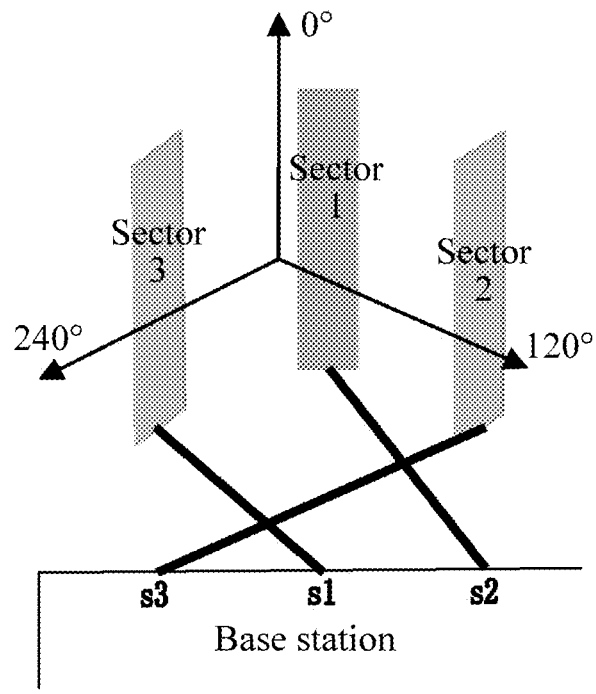
FIG. 6 and FIG. 7 are schematic diagrams of a mutual inverse connection of feeders of three co-site sectors and of a corresponding sector coverage condition, respectively.
Figure 7:
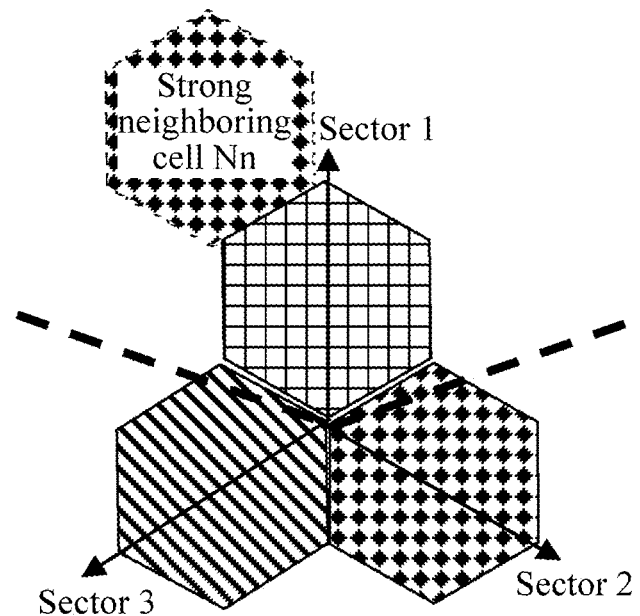

FIG. 2 and FIG. 3 are schematic diagrams of a normal feeder connection of three cells and of a coverage condition of the cells, respectively, where s1 represents a feeder of a sector 1, s2 represents a feeder of a sector 2, and s3 represents a feeder of a sector 3. A sector-level feeder inverse connection has the following two conditions: one is that the feeders of two sectors in the same base station are inversely connected (as shown in FIG. 4 and FIG. 5); and the other one is that mutual inverse connection occurs in the three sectors of the same base station (as shown in FIG. 6 and FIG. 7). The "sector" here is defined by referring to a base station end and planning design, and coverage conditions of the three sectors are represented by using different symbols, which is only for a purpose of convenient illustration.

FIG. 4 and FIG. 5 are schematic diagrams of a feeder inverse connection of two co-site sectors and of a corresponding coverage condition of the sectors, respectively. It can be seen from FIG. 4 and FIG. 5 that, when the feeders of two sectors in the same base station are inversely connected, an area that should be covered by a sector 1 in a site plan is actually covered by a sector 3, and an area that should be covered by the sector 3 in the site plan is actually covered by the sector 1.

FIG. 6 and FIG. 7 are schematic diagrams of a mutual feeder inverse connection of three co-site sectors and of a corresponding coverage condition of the sectors, respectively. It can be seen from FIG. 6 and FIG. 7 that, in this embodiment, s1 is connected to a sector 3, s2 is connected to a sector 1, s3 is connected to a sector 2, and the feeders of three sectors in the same base station are inversely connected with one another. An area that should be covered by the sector 1 in a site plan is actually covered by the sector 3, an area that should be covered by the sector 2 in the site plan is actually covered by the sector 1, and an area that should be covered by the sector 3 in the site plan is actually covered by the sector 2.

The sector-level feeder inverse connection in FIG. 2, FIG. 4, and FIG. 6 may be diagnosed by using the method according to the embodiment shown in FIG. 1. Diagnosis of three sectors, that is, the sector 1, the sector 2, and the sector 3, in a certain three-sector base station is taken as an example in the following for description.

As an example, first, an analysis is performed by taking the sector 1 as a sector to be analyzed.

Figure 8:
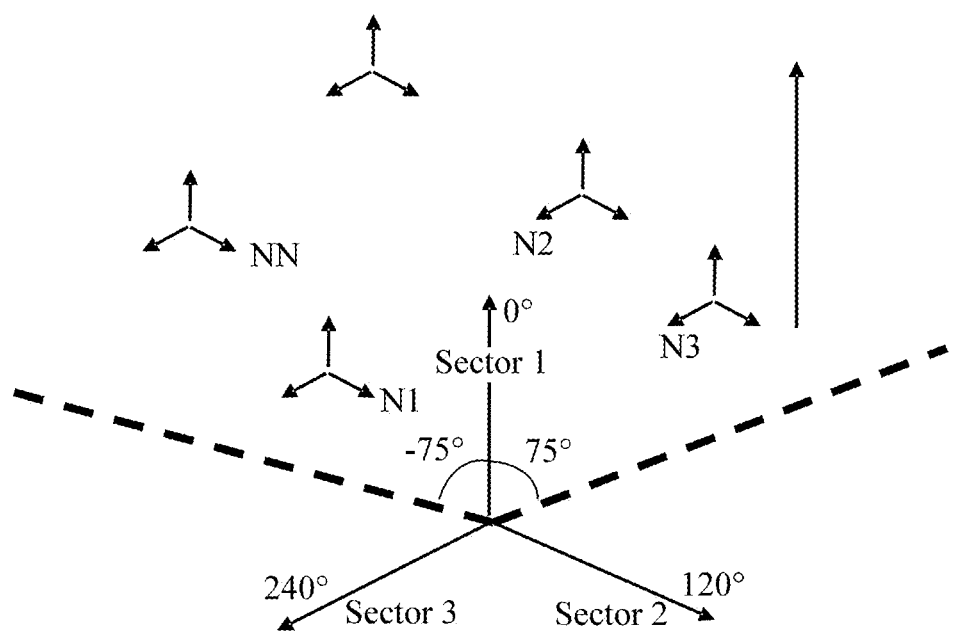
FIG. 8 is a schematic diagram of geographic topology non-co-site strong neighboring cells of a sector 1.

N planned non-co-site strong neighboring cells of the sector 1 may be determined according to planning parameters of the sector 1, where N is an integer greater than 0. Exemplarily, within a certain range at left and right of an antenna direction of the sector 1, such as [−75°, 75°], 1, 2 . . . n . . . , N geographic topology non-co-site strong neighboring cells, as the cells N1 to NN which are shown in FIG. 8, can be screened with reference to distances and positions.

Specifically, the planned N strong neighboring cells may be determined through the following steps:

Modeling is performed through a normal distribution function; by using an included angle of a cell position relative to a connection line of the cell as its independent variable, and using a position correction factor as a dependent variable, a position correction factor between the sector 1 and its certain candidate strong neighboring cell is calculated; a distance from the sector 1 to each candidate strong neighboring cell is corrected by using the position factor; and the corrected distances are sequenced in an ascending order, and the first N strong neighboring cells are taken as the geographic topology strong neighboring cells of the sector 1.

As known by persons skilled in the art, the determining of the strong neighboring cells is not limited to the foregoing method in specific implementation, and the geographic topology strong neighboring cells of the cell may be obtained through another method, for example, by determining through emulation or another modeling method.

Figure 9:
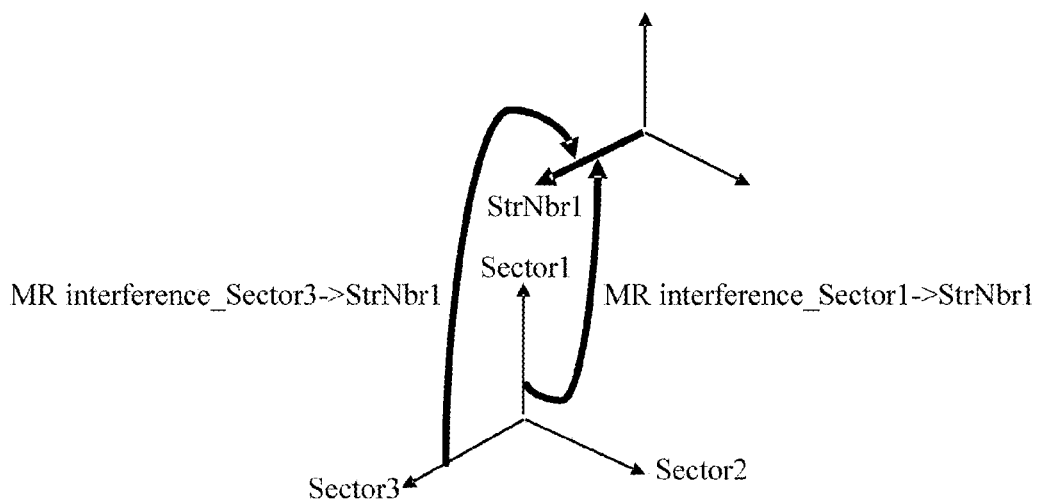
FIG. 9 is a schematic diagram of interference in the case of an inverse connection between a sector 1 and a sector 3.

Afterwards, interference that each sector of the base station, that is, the sector 1 to the sector 3, brings to the N non-co-site strong neighboring cells is determined. Specifically, for each of the strong neighboring cells: screening measurement data in the case that the strong neighboring cell serves as a serving cell, where it may be determined whether the strong neighboring cell is the serving cell according to an identifier (ID) of the serving cell in the measurement data; and by using the sector 1 to the sector 3 as the interference source of the strong neighboring cell, respectively, determining, by comparing a received signal strength indicator (RSSI) of the serving cell in the screened measurement data with an RSSI of each sector, a value of interference that each sector brings to the strong neighboring cell; exemplarily, the value of the interference that each sector brings to the strong neighboring cell is determined according to the RSSI in a measurement report reported by the terminal. And it is determined, in the interference that the sectors in the base station where the sector 1 is located bring to the strong neighboring cell, whether a sector having the greatest interference with the strong neighboring cell is the sector 1. For example, as shown in FIG. 9, in the case that the sector-level feeders of the sector 1 and the sector 3 are inversely connected, interference (MR interference_sector1->StrNbr1) that the sector 1 brings to its non-co-site strong neighboring cell Nbr1 is less than interference (MR interference_sector3->StrNbr1) that the sector 3 brings to its non-co-site strong neighboring cell Nbr1.

After a non-co-site strong neighboring cell is analyzed, the next strong neighboring cell is continuously analyzed. After N non-co-site strong neighboring cells are analyzed, it is determined whether a ratio of the number of the strong neighboring cells of a sector, not the sector 1, having the greatest interference with the strong neighboring cell, to the total number of the strong neighboring cells reaches a predetermined ratio threshold; if yes, it is determined that an inverse connection occurs in the sector 1; otherwise, it is determined that no inverse connection occurs in the sector 1. Exemplarily, the foregoing ratio threshold may be set according to demands, for example, which may be set to 70%.

In the specific implementation, as an example, the number of the non-co-site strong neighboring cells of a sector, not the sector 1, having the greatest interference with the strong neighboring cell may be recorded by a counter. When it is determined that the sector having the greatest interference with the strong neighboring cell is not the sector 1, that is, it is judged that the sector having the greatest interference with the strong neighboring cell is another sector, except the sector 1, of the base station, 1 is added to a value of the counter, and the sector having the greatest interference with the strong neighboring cell is recorded, where the sector having the greatest interference is possibly a sector inversely connected to the sector 1. Definitely, in addition to this recording method, another recording method can also be applicable.

After the sector 1 is analyzed, it is continuously analyzed whether the misconnection occurs in other sectors of the base station. If the misconnection occurs in not less than two sectors of the base station where the sector 1 is located, it is determined that a misconnection of the sectors exists in the corresponding base station. Specifically, with reference to the sector with the misconnection and a sector having the greatest interference with the non-co-site strong neighboring cell of a specific sector being which sectors, two specific sectors where the feeders are misconnected on the sector-level may be determined. When a feeder of a sector A is connected to an antenna of a sector B, and a feeder of the sector B is connected to an antenna of the sector A, a first sector and a second sector may be called sectors with a sector-level feeder misconnection. The sector A and the sector B are only for convenient illustration, which may be any sector.

Figure 10:
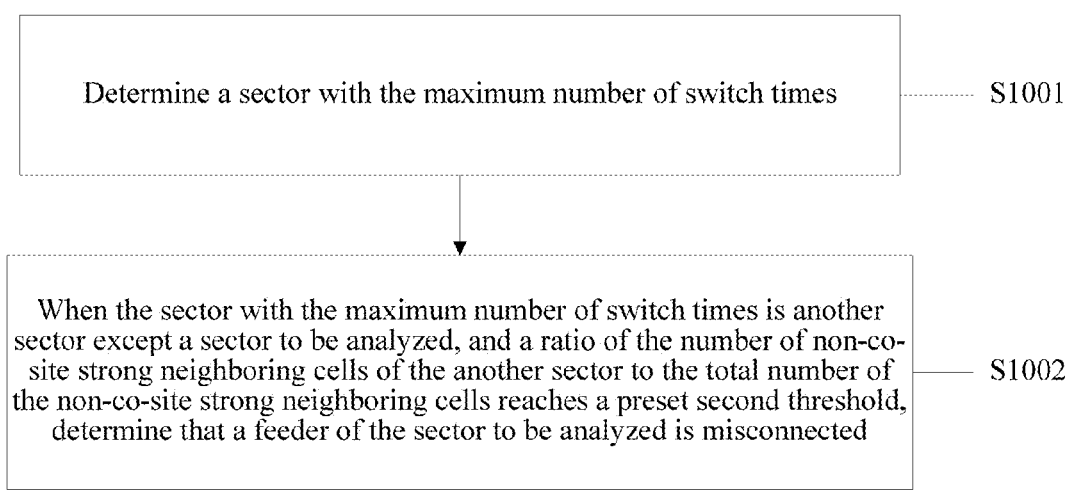
FIG. 10 is a flow chart of a method for diagnosing a feeder misconnection according to an embodiment of the present invention.

FIG. 10 is a flow chart of a method for diagnosing a feeder misconnection according to a second embodiment of the present invention. As shown in FIG. 10, the method includes:

Step S1001: For each of planned non-co-site strong neighboring cells of a sector to be analyzed, determine a sector where a terminal using the non-co-site strong neighboring cell as a serving cell is switched, for the maximum number of switch times among the number of switch times that is made statistic of within a predetermined time length, from the non-co-site strong neighboring cell to each sector of a base station where the sector to be analyzed is located.

Step S1002: When in all of the planned non-co-site strong neighboring cells of the sector to be analyzed, the sector where the terminal using each non-co-site strong neighboring cell as the serving cell is switched, for the maximum number of switch times among the number of switch times, from its serving cell to each sector of the base station where the sector to be analyzed is located is another sector except the sector to be analyzed, and a ratio of the number of non-co-site strong neighboring cells of the another sector to the total number of the non-co-site strong neighboring cells reaches a preset second threshold, determine that a feeder of the sector to be analyzed is misconnected.

The predetermined time length may be set according to demands, for example, which may be one day, one month, and so on.

The method for diagnosing a feeder misconnection in this embodiment is similar to the diagnosis method shown in FIG. 1, and it is also a method for judging a sector-level feeder misconnection. Different from the embodiment shown in FIG. 1, in this embodiment, through the number of switch times which is made statistics of and is of the terminal using the planned non-co-site strong neighboring cell of the sector to be analyzed as the serving cell being switched from its serving cell to each sector of the base station where the sector to be analyzed is located, it is diagnosed whether the feeder of the sector is misconnected. Specifically, in this embodiment, it is judged whether the feeder of the sector to be analyzed is misconnected in a sector level according to whether the sector where the terminal using each one of N non-co-site strong neighboring cells of the sector to be analyzed as a serving cell is switched, for the maximum number of switch times among the number of switch times, from its serving cell to each sector of the base station where the sector to be analyzed is located is the sector to be analyzed.

The second threshold is preferentially a percentage greater than or equal to 70%.

Reference is made to the foregoing description for the method for determining the planned non-co-site neighboring cells of the sector to be analyzed.

In the same way, diagnosis of three sectors, that is, a sector 1, a sector 2, and a sector 3, of a certain base station is taken as an example for description. As an example, first, an analysis is performed by taking the sector 1 as a sector to be analyzed.

Exemplarily, when the sector with the maximum number of switch times is not the sector to be analyzed, the sector with the maximum number of switch times may be recorded, and the sector with the maximum number of switch times is possibly a sector inversely connected to the sector to be analyzed, such as the sector 1. For example, as shown in FIG. 9, in the case that the feeders of the sector 1 and the sector 3 are inversely connected, the number of switch times that the terminal using the non-co-site strong neighboring cell Nbr1 of the sector 1 as a serving cell is switched to the sector 1 is less than the number of switch times that the terminal is switched to the sector 3.

After a non-co-site strong neighboring cell is analyzed, the next strong neighboring cell is continuously analyzed. Similar to the foregoing description, the number of the non-co-site strong neighboring cells of a sector, not the sector 1, where the terminal using each strong neighboring cell in N strong neighboring cells as a serving cell is switched, for the maximum number of switch times in the number of switch times, from its serving cell to each sector of the base station where the sector 1 is located, may be recorded by a counter. Definitely, in addition to this recording method, another recording method can also be applicable.

After N non-co-site strong neighboring cells are analyzed, it is determined whether a ratio of the number of the strong neighboring cells of a sector, not the sector 1, with the maximum number of switch times to the total number of the strong neighboring cells reaches a predetermined ratio threshold; if yes, it is determined that a misconnection occurs in the sector 1, that is, a feeder of the sector 1 is connected to an antenna corresponding to another sector; otherwise, it is determined that no misconnection occurs in the sector 1. Exemplarily, the foregoing ratio threshold may be set according to demands, for example, which may be set to 70%.

After the sector 1 is analyzed, it is continuously analyzed whether the misconnection occurs in other sectors of the base station. If the misconnection occurs in not less than two sectors of the base station where the sector 1 is located, it is determined that a misconnection of the sectors exists in the corresponding base station. Specifically, with reference to the sector with the misconnection and the specific sector with the maximum number of switch times being which sectors, two specific sectors where the feeders are inversely connected may be determined.

In actual usage, the embodiment based on the interference shown in FIG. 1 and the embodiment based on the number of switch times shown in FIG. 10 may be independently used, and may also be used in a combination to perform a cross validation, so as to improve diagnosis accuracy.

A third embodiment of the present invention further provides a solution for diagnosing a feeder misconnection. According to this technical solution, within different predetermined angle ranges, the number of terminals using a sector to be analyzed as a serving cell is determined; a direction of a sector with the maximum number of terminals using the sector to be analyzed as the serving cell is determined as an actual distribution direction of users of the sector to be analyzed; and according to whether the actual distribution direction of the sector to be analyzed is consistent with a planned direction to be analyzed, determine whether a feeder of the sector to be analyzed is misconnected, where the actual distribution direction of the users of the sector is an actual distribution direction of traffic of the sector.

In the third embodiment of the present invention, within the predetermined angle range, the number of the terminals using the sector to be analyzed as the serving cell is determined according to measurement data and positioning information which are of a terminal.

Figure 11:
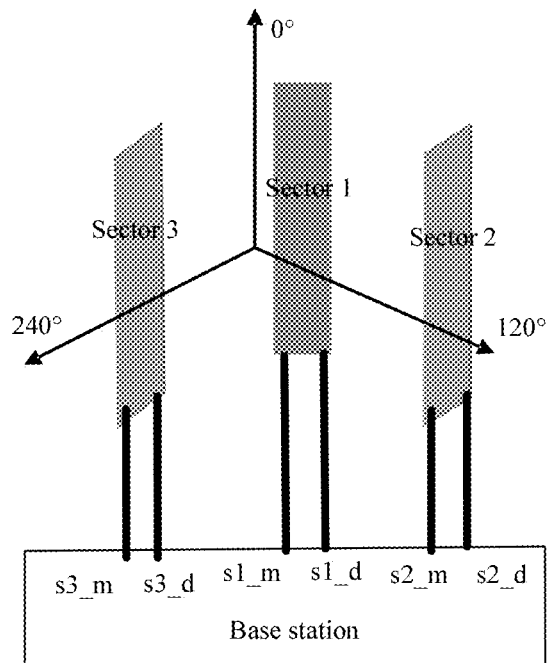
FIG. 11 is a schematic diagram of a normal feeder connection of three sectors of a cell.
Figure 12:
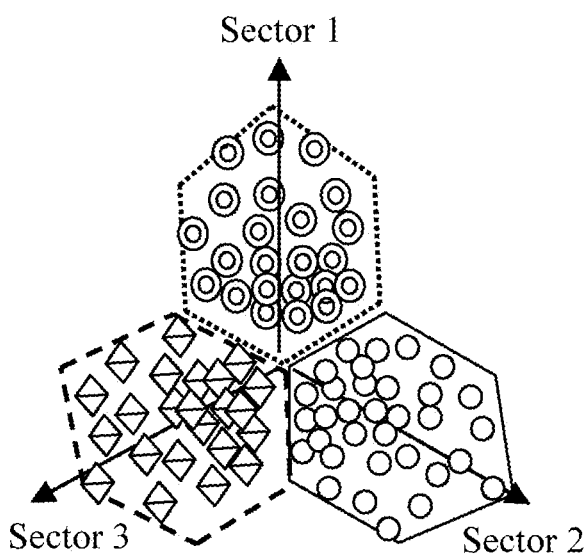
FIG. 12 is a schematic diagram of user distribution corresponding to FIG. 13.

FIG. 11 is a schematic diagram of a normal feeder connection of three sectors of a cell. The drawing shows that a main feeder and a diversity feeder of the sector are both normally connected. FIG. 12 is a schematic diagram of user distribution corresponding to FIG. 11. In FIG. 11, s1_m represents a main of a sector 1, s1_d represents a diversity of the sector 1, s2_m represents a main of a sector 2, s2_d represents a diversity of the sector 2, s3_m represents a main of a sector 3, and s3_d represents a diversity of the sector 3. The "sector" in FIG. 12 is defined with reference to a base station end and planning design, and terminals belonging to different sectors are represented by using different symbols in three sectors, which is only for a purpose of convenient illustration.

Figure 13:
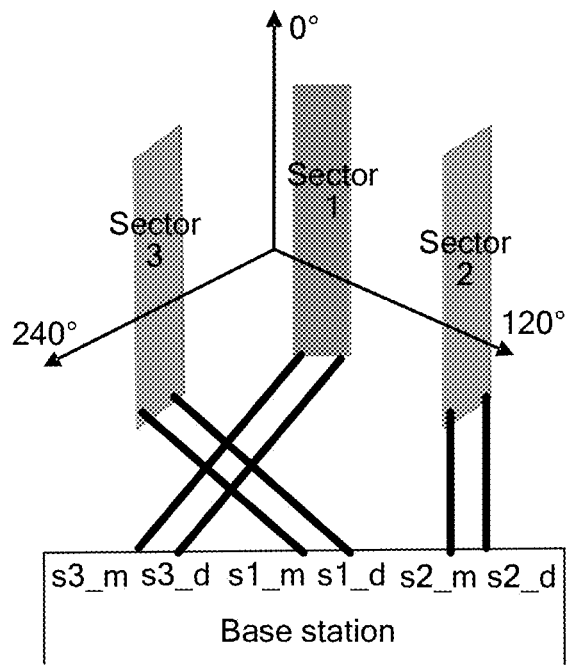
FIG. 13 and FIG. 14 are a schematic diagram of a feeder connection of sectors and a schematic diagram of corresponding user distribution, respectively, in the case of an inverse connection between a main and a main, and between a diversity and a diversity of two sectors.
Figure 14:
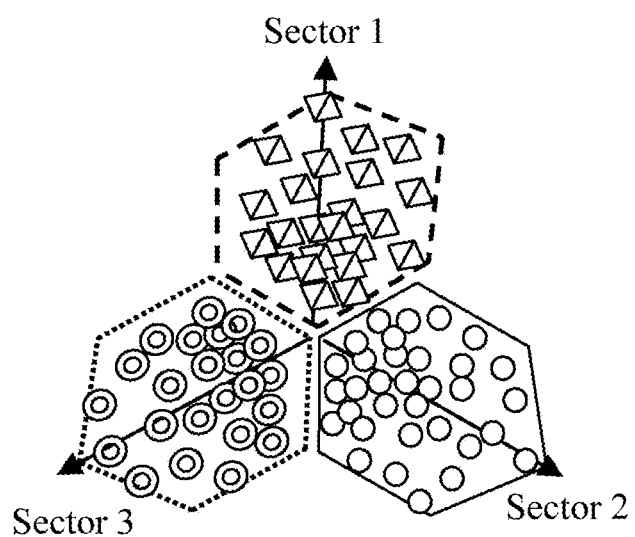

FIG. 13 and FIG. 14 are a schematic diagram of a feeder connection of sectors and a schematic diagram of corresponding user distribution, respectively, in the case of an inverse connection between a main and a main, and between a diversity and a diversity of two sectors, respectively. In the examples shown in FIG. 12 and FIG. 13, the mains and the diversities of the sector 1 and the sector 3 are inversely connected, respectively, that is, the main of the sector 1 in a base station is connected to the main of an antenna of the sector 3, the diversity of the sector 1 in the base station is connected to the diversity of an antenna of the sector 3; the main of the sector 3 in the base station is connected to the main of the antenna of the sector 1, and the diversity of the sector 3 in the base station is connected to the diversity of the antenna of the sector 1. As shown in FIG. 14, in the case of the feeder connection shown in FIG. 12, according to background statistics, users of the sector 1 are distributed in the sector 3, and users of the sector 3 are distributed in the sector 1.

Figure 15:
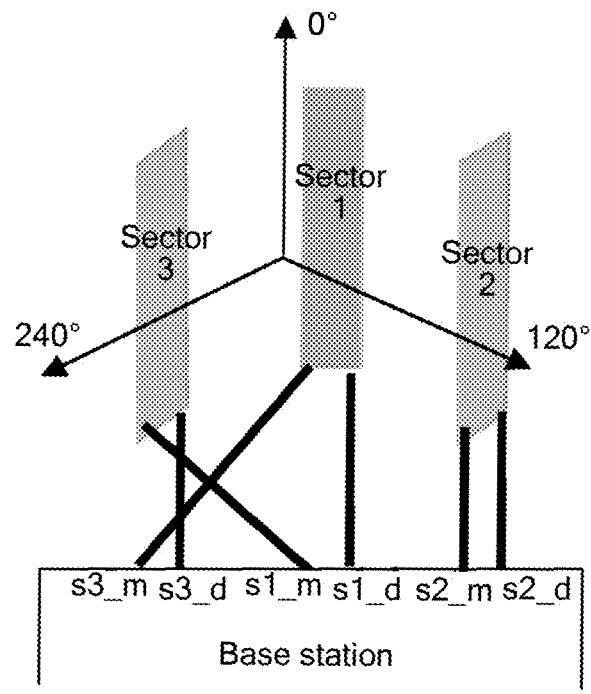
FIG. 15 and FIG. 16 are a schematic diagram of a feeder connection of sectors and a schematic diagram of corresponding user distribution, respectively, when a main and a main of two sectors are inversely connected while diversities are not inversely connected.
Figure 16:
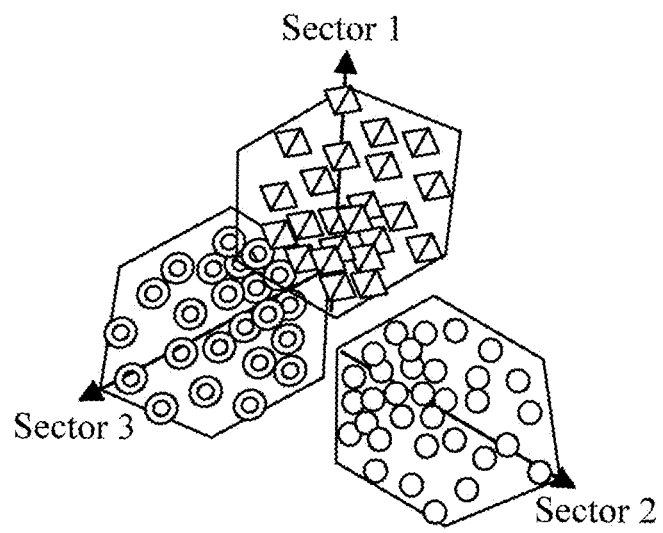

FIG. 15 and FIG. 16 are a schematic diagram of a feeder connection of sectors and a schematic diagram of corresponding user distribution, respectively, when a main and a main of two sectors are inversely connected while diversities are not inversely connected. In this example, an inverse connection of the mains of the sector 1 and the sector 3 is taken as an example. As shown in FIG. 16, in the case of the feeder connection shown in FIG. 14, according to background statistics, users of the sector 1 are distributed in the sector 3, and users of the sector 3 are distributed in the sector 1.

Figure 17:
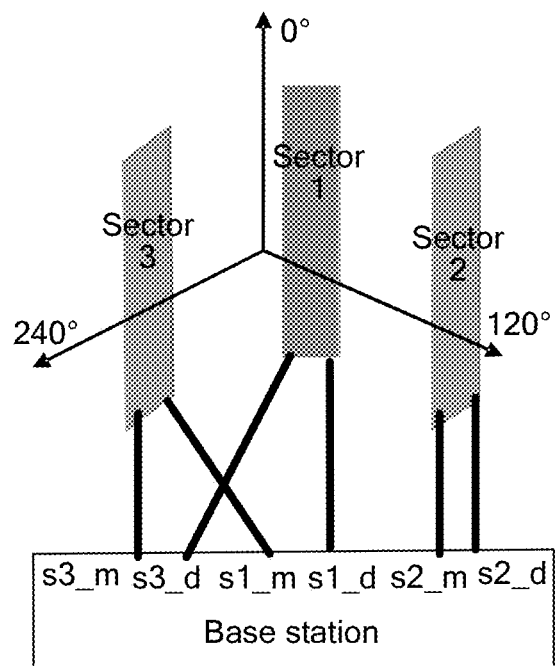
FIG. 17 and FIG. 18 are a schematic diagram of a feeder connection of sectors and a schematic diagram of corresponding user distribution, respectively, when a main of a sector and a diversity of another sector are inversely connected.
Figure 18:
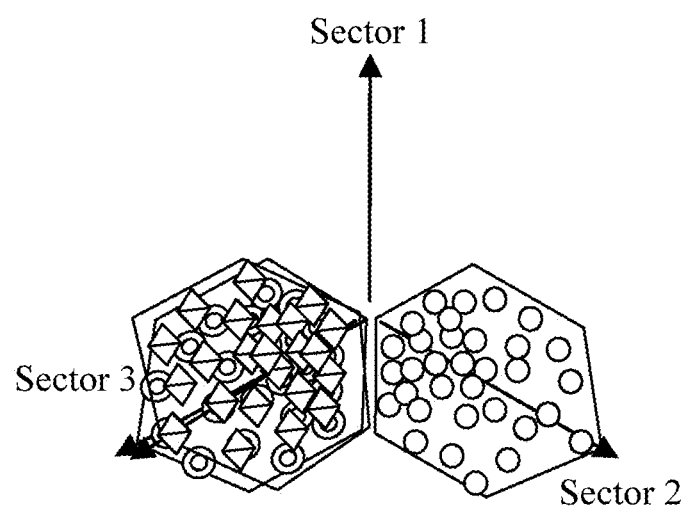

FIG. 17 and FIG. 18 are a schematic diagram of a feeder connection of sectors and a schematic diagram of corresponding user distribution, respectively, when a main of a sector and a diversity of another sector are inversely connected. In this example, the main of the sector 1 and the diversity of the sector 3 are inversely connected, the diversity of the sector 1 is not misconnected, and the main of the sector 3 is also not misconnected. As shown in FIG. 17, in the case of the feeder connection shown in FIG. 16, according to background statistics, users of the sector 1 are distributed in the sector 3, and users of the sector 3 are distributed normally.

Figure 19:
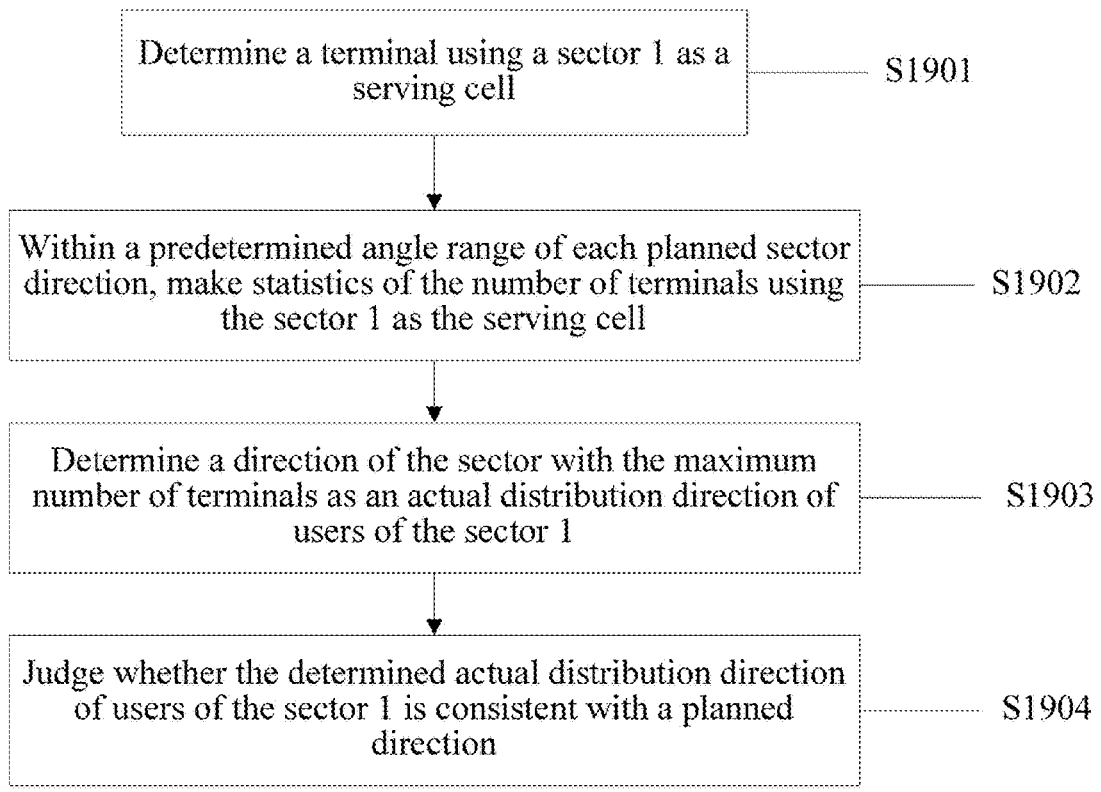
FIG. 19 is a schematic flow chart of a method for diagnosing a feeder misconnection according to an embodiment of the present invention.

FIG. 19 is a schematic flow chart of a method for diagnosing a feeder misconnection according to a third embodiment of the present invention. As shown in FIG. 19, in step S1901: for a selected sector to be analyzed, taking a sector 1 as an example in this embodiment, determine a terminal using the sector 1 as a serving cell. Exemplarily, the terminal using the sector 1 as the serving cell may be determined by using measurement data fed back by the terminal. Specifically, the terminal using the sector 1 as the serving cell may be determined by using cell identification (ID) information in the measurement data.

Figure 20:
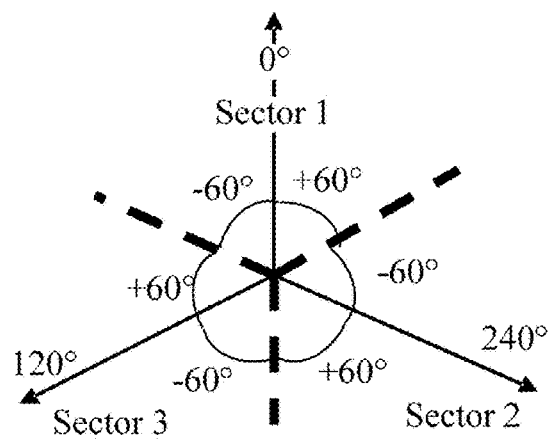
FIG. 20 shows a method for making statistics of the number of terminals using a sector 1 as a serving cell.

Step S1902: Make statistics of, within a predetermined angle range of each planned sector direction according to positioning information of the terminal using the sector 1 as the serving cell, the number of the terminals using the sector 1 as the serving cell. The method of statistics may be as shown in FIG. 20. Exemplarily but without limitation, in this example, the foregoing each planned sector direction includes: a 0° direction of the sector 1, a 120° direction of the sector 2, and a 240° direction of the sector 3. Exemplarily, the predetermined angle range may range from −60° to 60°.

Step S1903: Determine a direction of a sector with the maximum number of the terminals as an actual distribution direction of users of the sector 1, that is, an actual distribution direction of traffic.

Step S1904: Judge whether the determined actual distribution direction of the users of the sector 1 is consistent with a planned direction; if consistent, determine that a main of the sector 1 is not misconnected; otherwise, determine that the main of the sector 1 is misconnected, where the specific misconnection of the main of the sector 1 may be determined according to the determined actual distribution direction of the users of the sector 1. Exemplarily, if the determined actual distribution direction of the users of the sector 1 is a direction of the sector 2, it can be determined that the main of the sector 1 is connected to an antenna of the sector 2.

After the diagnosis is performed on the sector 1, diagnosis of all sectors in an area to be analyzed may be traversed, and a sector diagnosed to have a main misconnection may be marked.

In specific implementation of the embodiment of the present invention, the positioning information of the terminal may be pre-obtained by using positioning methods, such as assisted global positioning system (A-GPS) or real time trace (RTT), known by persons skilled in the art.

Figure 21:
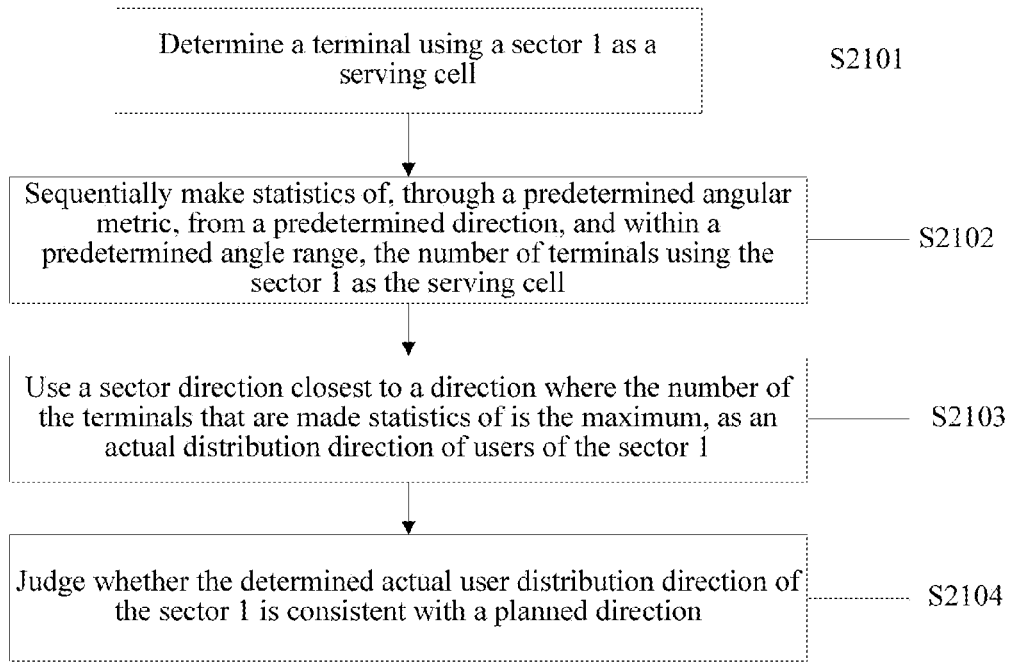
FIG. 21 is a schematic flow chart of a method for diagnosing a feeder misconnection according to another embodiment of the present invention.
Figure 22:
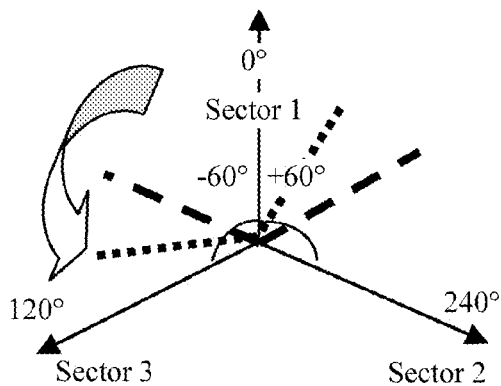
FIG. 22 shows another method for making statistics of the number of terminals using a sector 1 as a serving cell.

FIG. 21 is a schematic flow chart of a method for diagnosing a feeder misconnection according to a fourth embodiment of the present invention. As shown in FIG. 21, step S2101 is to the same as step S1901.

Step S2102: According to positioning information of a terminal using a sector 1 as a serving cell, through a predetermined angular metric (the angular metric may be set as, for example, 10°, 20°, and so on), sequentially make statistics of, from a predetermined direction such as a 0° direction of the sector and within a predetermined angle range (such as a range from −60° to 60°), the number of the terminals using the sector 1 as the serving cell, where the method of statistics may be as shown in FIG. 21.

Step S2103: Use a sector direction closest to a direction where the number of the terminals that is made statistics of is the maximum as an actual distribution direction of the users of the sector 1, that is, an actual distribution direction of traffic.

Step S2104 is the same as step S1904.

In the same way, after the diagnosis is performed on the sector 1, diagnosis of all sectors in an area to be analyzed may be traversed, and a sector diagnosed to have a main misconnection may be marked.

According to a fifth embodiment of the present invention, after it is determined, by using a method based on whether actual distribution of users of a sector is consistent with planned user distribution, whether a main of the sector is misconnected, a specific misconnection type of the sector may be further determined with reference to a difference of user signals received by the main and a diversity, including performing diagnosis of a "crossed pair" type. In the method for determining the difference of user signals received by the main and the diversity, a received signal strength indicator RSSI of the terminal of each reception path is used as a test signal to test whether the difference of user signals received by the main and the diversity of the sector reaches a predetermined difference threshold; if yes, it is determined that a difference of the main and the diversity exists in the sector, and feeders of the sector are crossed pairs in this case; otherwise, the difference of the main and the diversity does not exist. A combined diagnosis method is described in the following by taking a sector 2 as a sector to be analyzed.

According to the judgment of whether a main of the sector 2 is misconnected and of whether the difference of user signals received by the main and a diversity of the sector 2 exceeds a predetermined threshold, the following conditions exist:

A) If it is judged that the main of the sector 2 is misconnected based on the actual distribution direction of the users, that is, the actual traffic distribution, and the specific misconnection type is that "the actual traffic distribution of the sector 1 and that of the sector 2 are contrary to each other," but the mains and the diversities of the sector 1 and the sector 2 normally receive the user signals, it is determined that the sector 1 and the sector 2 belong to a problem type of "sector crossed feeder," that is, a main feeder of the sector 1 is connected to an antenna main of the sector 2, a diversity feeder of the sector 1 is connected to an antenna diversity of the sector 2, a main feeder of the sector 2 is connected to an antenna main of the sector 1, and a diversity feeder of the sector 2 is connected to an antenna diversity of the sector 1.

B) If it is judged that the main of the sector 2 is misconnected based on the actual traffic distribution, and the specific misconnection type is that "the actual traffic distribution of the sector 1 and that of the sector 2 are contrary to each other," and the differences of user signals received by the mains and the diversities of the sector 1 and the sector 2 exceed the pre-specified threshold, it is determined that the sector 1 and the sector 2 belong to a problem type that "the main of the sector 1 and the main of the sector 2 are inversely connected, but the diversity of the sector 1 and the diversity of the sector 2 are normal," which is a type of the "crossed pair."

C) If it is judged that the main of the sector 2 is misconnected based on the actual traffic distribution, and the specific misconnection type is that "the actual traffic distribution of the sector 1 and the sector 2 is in the sector 1," and the differences of user signals received by the mains and the diversities of the sector 1 and the sector 2 exceed the pre-specified threshold, it is determined that the sector 1 and the sector 2 belong to a problem type that "the diversity of the sector 1 and the main of the sector 2 are inversely connected, but the main of the sector 1 and the diversity of the sector 2 are normal," which is another type of the "crossed pair."

D) If it is judged that the main of the sector 2 is not misconnected based on the actual traffic distribution, but the differences of user signals received by the mains and the diversities of the sector 1 and the sector 2 both exceed the pre-specified threshold, it is determined that the sector 1 and the sector 2 belong to a problem type that "the diversity of the sector 1 and the diversity of the sector 2 are inversely connected, but the main of the sector 1 and the main of the sector 2 are normal," which is another type of the "crossed pair."

The foregoing description is the specific illustration of the diagnosis method for the sector 2, and a similar method may also be performed with extension to three or more sectors (this condition rarely occurs in actual application).

A judging threshold for the difference of user signals received by the main and the diversity may be set based on experience according to different systems. Several different thresholds may be set in specific operation, and the conditions of different threshold detection omissions and false detections are estimated according to a final analysis result.

In specific implementation of the embodiments of the present invention, the foregoing different embodiments may be used in combination. For example, in the case that the positioning information of the terminal may be obtained, after it is determined whether the main of the sector is misconnected by using the method based on whether the actual user distribution of the sector is consistent with the planned user distribution, the specific misconnection type of the feeder of the sector is further determined with reference to the difference of user signals received by the main and the diversity; and in the case that the positioning information of the terminal cannot be obtained, the diagnosis is performed based on the method of the embodiment shown in FIG. 1 and/or FIG. 10. In this way, the specific adopted diagnosis method may be flexibly selected according to the actual conditions of the system, thereby improving efficiency of solving the problems.

Figure 23:
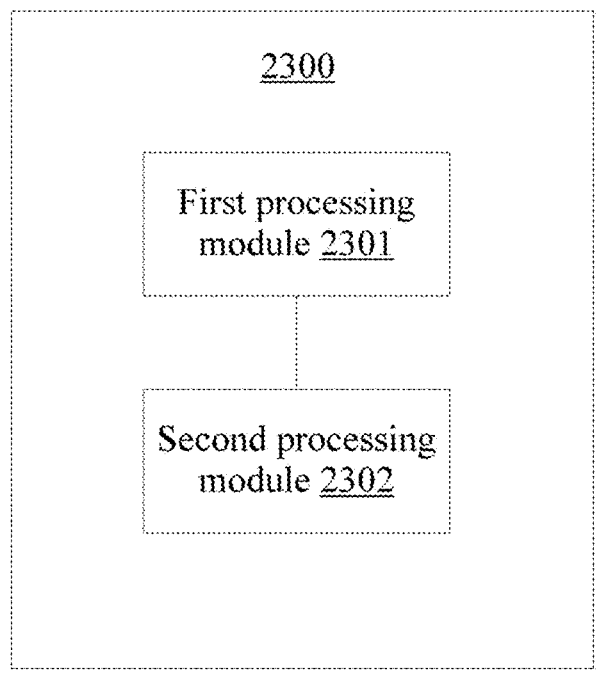
FIG. 23 is a schematic diagram of an apparatus for diagnosing a feeder misconnection according to an embodiment of the present invention.

As shown in FIG. 23, an embodiment of the present invention further provides an apparatus 2300 for diagnosing a feeder misconnection. The apparatus includes: a first processing module 2301 configured to, for each of planned non-co-site strong neighboring cells of a sector to be analyzed, by using each sector of a base station where the sector to be analyzed is located as an interference source, determine a sector having the greatest interference with the non-co-site strong neighboring cell; and a second processing module 2302 configured to, when in the planned non-co-site strong neighboring cells of the sector to be analyzed, the sector having the greatest interference with the non-co-site strong neighboring cell is another sector except the sector to be analyzed, and a ratio of the number of non-co-site strong neighboring cells of the another sector to the total number of the non-co-site strong neighboring cells reaches a preset first threshold, determine that a feeder of the sector to be analyzed is misconnected.

In the apparatus for diagnosing a feeder misconnection in the embodiment of the present invention, the first processing module is further configured to: from a measurement report reported by a terminal using the non-co-site strong neighboring cell as a serving cell, obtain measured level strength of the terminal in its serving cell and measured level strength of the terminal in each sector serving as an interference source; and determine, according to the obtained measured level strength, a value of interference which is of each sector serving as the interference source and is received by the non-co-site strong neighboring cell.

The first threshold is greater than or equal to 70%.

In the apparatus for diagnosing a feeder misconnection in the embodiment of the present invention, the first processing module makes statistics of, by using a counter, the number of the non-co-site neighboring cells of the another sector, except the sector to be analyzed, having the greatest interference with the non-co-site strong neighboring cell.

An embodiment of the present invention further provides an apparatus for diagnosing a feeder misconnection, including: a first processing module configured to, for each of planned non-co-site strong neighboring cells of a sector to be analyzed, determine a sector where a terminal using the non-co-site strong neighboring cell as a serving cell is switched, for the maximum number of switch times among the number of switch times within a predetermined time length, from the non-co-site strong neighboring cell to each sector of a base station where the sector to be analyzed is located; and a second processing module configured to, when in all of the planned non-co-site strong neighboring cells of the sector to be analyzed, the sector where the terminal using each non-co-site strong neighboring cell as the serving cell is switched, for the maximum number of switch times among the number of switch times, from its serving cell to each sector of the base station where the sector to be analyzed is located is another sector except the sector to be analyzed, and a ratio of the number of non-co-site strong neighboring cells of the another sector to the total number of the non-co-site strong neighboring cells reaches a preset second threshold, determine that a feeder in the sector to be analyzed is misconnected.

The second threshold is greater than or equal to 70%.

In the apparatus for diagnosing a feeder misconnection in the embodiment of the present invention, the first processing module makes statistics of, by using a counter, the number of the non-co-site strong neighboring cells of the another sector, except the sector to be analyzed, where the terminal using each non-co-site strong neighboring cell as the serving cell is switched, for the maximum number of switch times among the number of switch times, from its serving cell to each sector of the base station where the sector to be analyzed is located, in all of the planned non-co-site strong neighboring cells of the sector to be analyzed.

An embodiment of the present invention further provides an apparatus for diagnosing a feeder misconnection, including: a first processing module configured to determine, within different predetermined angle ranges, the number of terminals using a sector to be analyzed as a serving cell; a second processing module configured to determine a direction of a sector with the maximum number of terminals using the sector to be analyzed as a serving cell as an actual distribution direction of users of the sector to be analyzed; and a third processing module configured to: according to whether the actual distribution direction of users of the sector to be analyzed is consistent with a planned direction to be analyzed, determine whether a feeder of the sector to be analyzed is misconnected.

Further, in the apparatus for diagnosing a feeder misconnection in the embodiment of the present invention, the first processing module is further configured to determine, within different predetermined angle ranges according to serving cell identification information and positioning information which are reported by the terminal, the number of the terminals using the sector to be analyzed as a serving cell.

Further, in the apparatus for diagnosing a feeder misconnection in the embodiment of the present invention, the first processing module is further configured to: for each planned sector direction, determine, within the predetermined angle range of the sector direction, the number of the terminals using the sector to be analyzed as a serving cell.

Further, in the apparatus for diagnosing a feeder misconnection in the embodiment of the present invention, the first processing module is further configured to: according to a selected direction, through a preset angular metric, and from the predetermined angle, sequentially make statistics of, within the predetermined angle ranges, the number of the terminals using the sector to be analyzed as the serving cell.

Further, in the apparatus for diagnosing a feeder misconnection in the embodiment of the present invention, the third processing module is further configured to execute at least one of the following steps: when the actual distribution direction of users of the sector to be analyzed is contrary to an actual distribution direction of users of a second sector of the base station where the sector to be analyzed is located, and differences of user signals received by mains and diversities of both the sector to be analyzed and the second sector do not exceed a predetermined difference threshold, determining that a sector crossed feeder exists between the sector to be analyzed and the second sector; when the actual distribution direction of users of the sector to be analyzed is contrary to the actual distribution direction of users of the second sector, and the differences of user signals received by the mains and the diversities of both the sector to be analyzed and the second sector exceed the predetermined difference threshold, determining that a main of the sector to be analyzed and a main of the second sector are inversely connected, and a diversity of the sector to be analyzed and a diversity of the second sector are normal; when the actual distribution directions of users of both the sector to be analyzed and the second sector are a planned distribution direction of users of the sector to be analyzed, and the differences of user signals received by the mains and the diversities of both the sector to be analyzed and the second sector exceed the predetermined difference threshold, determining that the main of the sector to be analyzed and the diversity of the second sector are inversely connected, and the diversity of the sector to be analyzed and the main of the second sector are normal; and when the mains of the sector to be analyzed and the second sector are not misconnected, but the differences of user signals received by the mains and the diversities of both the sector to be analyzed and the second sector exceed the predetermined difference threshold, determining that the diversity of the sector to be analyzed and the diversity of the second sector are inversely connected, and the main of the sector to be analyzed and the main of the second sector are normal.

The second sector is another sector different from the sector to be analyzed.

Persons skilled in the art should understand that, the apparatus for diagnosing a feeder misconnection can be implemented by using software, hardware, or a combined manner of software and hardware. Corresponding processing modules may be implemented by processors which are configured for processing corresponding functions.

Persons skilled in the art should understand that, various variations and modifications can be made to the embodiments disclosed in the foregoing without departing from the essence of the present invention, and these variations and modifications should fall within the protection scope of the present invention. Therefore, the protection scope of the present invention should be restricted by the appended claims.

What is claimed is:

1. A method for diagnosing a feeder misconnection comprising:
    determining, within different predetermined angle ranges, a number of terminals using a sector to be analyzed as a serving cell;
    determining a direction of a sector with a maximum number of terminals using the sector to be analyzed as the serving cell as an actual distribution direction of users of the sector to be analyzed;
    determining, according to whether the actual distribution direction of users of the sector to be analyzed is consistent with a planned direction of users of the sector to be analyzed, whether a feeder of the sector to be analyzed is misconnected, and
    wherein the method further comprises at least one of the following steps:
    determining that a sector crossed feeder exists between the sector to be analyzed and a second sector of a base station when the actual distribution direction of users of the sector to be analyzed is contrary to an actual distribution direction of users of the second sector of the base station where the sector to be analyzed is located, and differences of user signals received by mains and diversities of both the sector to be analyzed and the second sector do not exceed a predetermined difference threshold;
    determining that a main of the sector to be analyzed and a main of the second sector are inversely connected, and a diversity of the sector to be analyzed and a diversity of the second sector are normal when the actual distribution direction of users of the sector to be analyzed is contrary to the actual distribution direction of users of the second sector, and the differences of user signals received by the mains and the diversities of both the sector to be analyzed and the second sector exceed the predetermined difference threshold;
    determining that the main of the sector to be analyzed and the diversity of the second sector are inversely connected, and the diversity of the sector to be analyzed and the main of the second sector are normal when the actual distribution directions of users of both the sector to be analyzed and the second sector are a planned distribution direction of users of the sector to be analyzed, and the differences of user signals received by the mains and the diversities of both the sector to be analyzed and the second sector exceed the predetermined difference threshold; and
    determining that the diversity of the sector to be analyzed and the diversity of the second sector are inversely connected, and the main of the sector to be analyzed and the main of the second sector are normal when the mains of the sector to be analyzed and the second sector are not misconnected, but the differences of user signals received by the mains and the diversities of both the sector to be analyzed and the second sector exceed the predetermined difference threshold.

2. An apparatus for diagnosing a feeder misconnection comprising:
    a first processor configured to determine, within different predetermined angle ranges, a number of terminals using a sector to be analyzed as a serving cell;
    a second processor configured to determine a direction of a sector with a maximum number of terminals using the sector to be analyzed as the serving cell as an actual distribution direction of users of the sector to be analyzed;
    a third processor configured to determine whether a feeder of the sector to be analyzed is misconnected according to whether the actual distribution direction of users of the sector to be analyzed is consistent with a planned direction of users of the sector to be analyzed, and
    wherein the third processor is further configured to execute at least one of the following steps:
    determine that a sector crossed feeder exists between the sector to be analyzed and a second sector of the base station when the actual distribution direction of users of the sector to be analyzed is contrary to an actual distribution direction of users of the second sector of the base station where the sector to be analyzed is located, and differences of user signals received by mains and diversities of both the sector to be analyzed and the second sector do not exceed a predetermined difference threshold;
    determine that a main of the sector to be analyzed and a main of the second sector are inversely connected, and a diversity of the sector to be analyzed and a diversity of the second sector are normal when the actual distribution direction of users of the sector to be analyzed is contrary to the actual distribution direction of users of the second sector, and the differences of user signals received by the mains and the diversities of both the sector to be analyzed and the second sector exceed the predetermined difference threshold;
    determine that the main of the sector to be analyzed and the diversity of the second sector are inversely connected, and the diversity of the sector to be analyzed and the main of the second sector are normal when the actual distribution directions of users of both the sector to be analyzed and the second sector are a planned distribution direction of users of the sector to be analyzed, and the differences of user signals received by the mains and the diversities of both the sector to be analyzed and the second sector exceed the predetermined difference threshold; and
    determine that the diversity of the sector to be analyzed and the diversity of the second sector are inversely connected, and the main of the sector to be analyzed and the main of the second sector are normal when the mains of the sector to be analyzed and the second sector are not misconnected, but the differences of user signals received by the mains and the diversities of both the sector to be analyzed and the second sector exceed the predetermined difference threshold.

* * * * *